(12) United States Patent
Ozer et al.

(10) Patent No.: US 6,228,526 B1
(45) Date of Patent: May 8, 2001

(54) BATTERY PACK HAVING DURABLE TERMINALS

(75) Inventors: Yaacov Ozer; Levi Sales, both of Kowloon (HK)

(73) Assignee: Rosslare Enterprises, Ltd., Hong Kong (HK)

( * ) Notice: Subject to any disclaimer, the term of this patent is extended or adjusted under 35 U.S.C. 154(b) by 0 days.

(21) Appl. No.: 09/320,385

(22) Filed: May 26, 1999

Related U.S. Application Data
(60) Provisional application No. 60/134,352, filed on May 14, 1999.

(51) Int. Cl.⁷ ................................................ H01M 2/10
(52) U.S. Cl. .............................. 429/96; 429/97; 429/99; 429/100; 429/65; 429/1
(58) Field of Search .................................. 429/96, 97, 99, 429/100, 1, 65

(56) References Cited

U.S. PATENT DOCUMENTS

| | | | |
|---|---|---|---|
| 5,415,947 | * 5/1995 | Mitsui et al. | 429/1 |
| 5,437,938 | 8/1995 | Mitsui et al. | 439/1 |
| 5,601,942 | * 2/1997 | Fedele | 429/159 |

\* cited by examiner

*Primary Examiner*—Stephen Kalafut
*Assistant Examiner*—Angela J. Martin
(74) *Attorney, Agent, or Firm*—Hogan & Hartson, L.L.P.

(57) ABSTRACT

A rechargeable battery pack for portable electronic devices such as a portable video camera possesses improved durability and longevity. The rechargeable battery pack includes an insulated housing; at least one rechargeable battery permanently encased in the housing; and terminal means adapted to electrically engage the portable electronic device. The terminal means includes open-ended anode and cathode pin terminals formed within opposed corner sections of the housing. Each pin terminal includes an open-ended metal contact arranged within the pin terminal in electrical contact with the rechargeable battery means. Each pin terminal has a relatively smaller diameter or cross-sectional area than a relatively larger diameter or cross-sectional area of a complementary terminal pin of an electronic device adapted to be inserted into the pin terminal. A slit opening formed through a corresponding outer side wall of both the pin terminal and the metal contact extends from an open end of the pin terminal along the outer side wall of the pin terminal and the metal contact. Additionally, the slit opening constitutes a means for expanding the cross-sectional area of the pin terminal upon insertion of the terminal pin therein to insure a snug and reliable fit and electrical connection.

9 Claims, 4 Drawing Sheets

BATTERY PACK HAVING DURABLE TERMINALS

PRIORITY APPLICATION

This application claims priority from provisional patent application Ser. No. 60/134,352, filed May 14, 1999 and entitled "Battery Pack Having Durable Terminals," which application is hereby incorporated by reference in its entirety.

BACKGROUND OF THE INVENTION

1. Field of the Invention

The present invention relates to a battery pack used, for example, in conjunction with a camcorder or other portable video camera device and, more particularly, to a rechargeable battery pack having a pin terminal providing improved durability and longevity to the battery pack.

2. Description of the Related Art

Battery packs used, for example, with portable electronic devices such as portable video cameras, have found increasing utility in recent years due to the burgeoning popularity and proliferation of diverse portable electronic devices and the need to provide power to such devices on an ongoing basis whenever and wherever the user wishes to employ them. Generally, such battery packs comprise an insulated housing, at least one rechargeable battery permanently encased in the housing, and a structural mechanism for attaching the battery pack to an electronic device in such a manner that electrical energy may be continuously supplied from the battery to the electronic device.

One such known and commercially available battery pack for a portable video camera is illustrated in FIGS. 1A and B. As shown in FIG. 1A, battery pack 10 comprises an insulated casing 11 and rechargeable batteries 12 and 13 connected in series and encased in side-by-side relation within casing 11. Open-ended anode and cathode pin terminals 14 and 15 are provided within opposed corner sections of casing 11 and have open outer ends extending to an end of the casing 11 and are open to receive connecting pins of an electronic device. A slot or groove may be provided on an outer surface of insulated casing 11 to guide the battery pack 10 into appropriate engagement with a portable video camera (not shown) during insertion. Pin terminals 14 and 15 comprise open-ended hollow metal cylindrical contact elements arranged in open-ended cylindrical holes formed in the molded plastic body of housing or casing 11. Metal contact elements within the terminals 14 and 15 maintain electrical contact with batteries 12 and 13.

In use, battery pack 10 is inserted into a battery chamber provided in a video camera (not shown). The battery chamber has substantially the same size and cross-sectional shape as the battery pack 10. Upon insertion of the battery pack into the battery chamber of the video camera, the slots or grooves in the battery housing are received by and slide along a complimentary ridge formed on an inner wall of the video camera chamber. At the inner end of the video camera chamber, terminals 14 and 15 of the battery pack engage and receive therein cylindrical metal pins arranged on an inner end wall of the chamber. Electrical energy is thus provided to the video camera from batteries 12 and 13, through the metal contact elements within terminals 14 and 15, and finally to and through the metal pins formed on the inner end wall of the hollow video camera chamber.

There are problems associated with this commercially available battery pack. Most importantly, the diameter of the cylindrical metal contact elements within the terminals is slightly larger than the diameter of the video camera pins that they receive, so that the pins may be successfully inserted into terminals 14 and 15. However, wear and tear on the video camera pins and metal contacts of the terminals, resulting from continued engagement and disengagement of the battery pack with the video camera, loosens the fit of the pins in terminals 14 and 15, resulting in deterioration of the desired electrical connection. Moreover, dirt and lint accumulate over time in the interior of terminals 14 and 15, adversely affecting the interconnection of the battery pack and the video camera and further deteriorating the desired electrical connection.

Another known and commercially available battery pack for a portable video camera is illustrated in FIGS. 2A and B. The battery pack of FIGS. 2A and B has a similar housing and battery arrangement as the battery pack shown in FIG. 1. Moreover, as shown in FIG. 2A, open-ended anode and cathode pin terminals 24 and 25 are formed at opposed corner sections of casing 21 and have open ends. However, terminals 24 and 25 are not formed as cylindrical holes within casing 21, but rather are formed as open-sided U-shaped terminals with open-sided U-shaped metal contact elements 27 and 28 arranged therein. The open sides of terminals 24 and 25 and metal contact elements 27 and 28 allow accumulated lint and dirt to be easily removed from the terminals. The separation between the U-shaped metal contact elements 27 and 28 is, at its closest, slightly smaller than the diameter of the pins of the video camera that it is adapted to engage. The upper and lower faces of the metal contact elements 27 and 28 are flexible and curved slightly inwardly to create an inward spring bias. Accordingly, as a video camera pin is inserted, for example, into terminal 24, the cylindrical surface of the pin pushes against the flexible biased upper and lower faces of metal contact element 27. The inward spring bias of the upper and lower faces against the cylindrical surface of the pin creates a snug fit between the pin and the terminal 24 into which it is inserted.

The FIG. 2 battery pack improves upon the deficiencies of the FIG. 1 battery pack by providing terminals that can easily be cleaned of debris and by providing a fit between terminal and pin that is less subject to wear and deterioration. However, the battery pack shown in FIG. 2 is itself problematic. Specifically, the open-ended and open-sided terminal configuration results in a battery pack having a fragile bottom wall 30 that is easily broken. Rechargeable battery packs are frequently mishandled during use, by either being accidentally banged or dropped. The terminal wall 30 of the battery pack illustrated in FIG. 2 is easily subject to breakage during such mishandling, destroying the utility of the battery pack.

Accordingly, the need currently exists for a battery pack for electronic devices, such as a rechargeable battery pack for a portable video camera device, which not only achieves its intended function of providing electrical energy to the electronic device, but which is also characterized by durability and longevity of reliable optimum performance.

SUMMARY OF THE PREFERRED EMBODIMENTS

An object of the present invention is to provide an improved battery pack for use in electronic devices such as portable video camera devices and the like.

A further object of the present invention is to provide a rechargeable battery pack for use in electronic devices such as portable video camera devices and the like that maximizes the durability and useful life of the rechargeable battery pack vis-a-vis the electronic device in which the rechargeable battery pack is used.

These and other objects are achieved, in accordance with one embodiment of the present invention, by providing a rechargeable battery pack for a video camera device or other portable electronic device comprising an insulated housing, rechargeable battery means permanently encased in the housing, and terminal means adapted to electrically engage the portable electronic device, wherein the terminal means includes open-ended anode and cathode pin terminals formed within opposed corner sections of the housing, each pin terminal including an open-ended metal contact arranged within the pin terminal in electrical contact with the rechargeable battery means, and slit means formed through a corresponding outer side wall of both the pin terminal and the metal contact, the slit means extending from an open end of the pin terminal along the outer side wall of the pin terminal and the metal contact.

In accordance with another embodiment of the present invention, each pin terminal of the terminal means has a relatively smaller diameter or cross-sectional area than a relatively larger diameter or cross-sectional area of a terminal pin of an electronic device that is adapted to be inserted therein, whereby the terminal means is adapted to snugly receive the terminal pin therein. In this embodiment, the slit means functions as a means adapted to expand the cross-sectional area of each pin terminal upon insertion of a relatively larger diameter terminal pin into the pin terminal to snugly receive the terminal pin therein.

The rechargeable battery means can include one or more rechargeable batteries. Preferably, the insulated housing is made of injection-molded plastic and the pin terminals are sufficiently resilient as to function as terminals even in the absence of a portion of their surrounding plastic housing.

BRIEF DESCRIPTION OF THE DRAWINGS

The present invention will now be described and will be better understood in conjunction with the accompanying drawings, in which.

DETAILED DESCRIPTION OF THE PREFERRED EMBODIMENTS

Figure 1A:
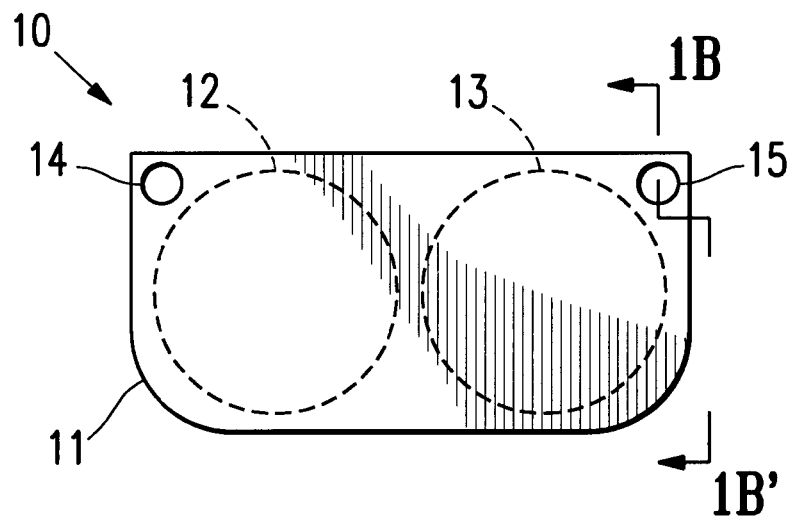
FIGS. 1A and B are end and side perspective views, respectively, of a known and commercially available rechargeable battery pack.

An embodiment of a battery pack in accordance with the present invention is illustrated in FIGS. 3 to 6.

As shown in FIGS. 3 to 6, a battery pack in accordance with the present invention is generally indicated at 50. Secondary/rechargeable batteries 51 and 52 are connected in series (not shown) and arranged within an insulated casing or housing generally indicated at 60. Housing 60 includes a first wall 61, including curved ends 62 and 63, a flat second wall 64, and opposed side walls 65 and 66 interconnecting top wall 61 and bottom wall 64. Groove 67 along the center of the second wall 64 provides a ridge internal to the battery chamber to position and hold the batteries in place within the battery pack. The battery chamber of the video camera device has essentially the same size and cross-sectional shape as battery pack 50 so that the battery pack can easily be received therein while allowing the electronic device to be compact. The battery pack may be used in other electronic devices, particularly portable electronic devices. Such other electronic devices typically provide a similar matched battery chamber for receiving the battery pack.

Battery pack 50 includes opposed hollow terminals 70 and 71 formed in housing 60 at opposed corner junctions between flat bottom wall 64 and opposed side walls 65 and 66. Hollow pin terminals 70 and 71 are integrally formed within housing 60 and include slit openings 72 and 73 formed in each of the side walls 65 and 66. C-shaped metal contact elements 74 and 75 are arranged in terminals 70 and 71 and include slit openings formed at locations corresponding to slit openings 72 and 73 of terminals 70 and 71. Accordingly, the configuration of each of pin terminals 70 and 71 is an almost-closed C-shaped cross-section, with a narrow slit opening extending along the outer side wall of the terminal from the outer open end of the terminal towards the inner closed end of the terminal. Other cross-sectional configurations of the terminals are, of course, possible. The metal contact elements 74 and 75 are arranged in known manner in electrical contact (not shown) with batteries 51 and 52.

Preferably, the diameter of each of the C-shaped metal contact elements 74 and 75, and hence the diameter of pin terminals 70 and 71, is slightly and relatively smaller than the relatively larger diameter of terminal pins of the video camera device to be inserted into the terminals 70 and 71. When the battery pack is inserted into the battery chamber of an electronic device, metal terminal pins arranged at one end of the battery chamber are guided into terminals 70 and 71. As the relatively larger diameter pins enter the slightly and relatively smaller diameter metal contacts of the pin terminals, the cross-sectional area of each terminal expands or widens slightly to snugly receive the pin therein, due to and facilitated by the slit opening in the side wall of the terminal. This snug fit ensures a strong and reliable electrical connection from the battery means in the battery pack to the terminal and thence through the pin snugly engaged in the terminal to the video camera device. In this manner, the slit openings function as a means adapted to expand the cross-sectional area of the pin terminals upon insertion of the relatively larger diameter terminal pins into the pin terminals.

Figure 1B:
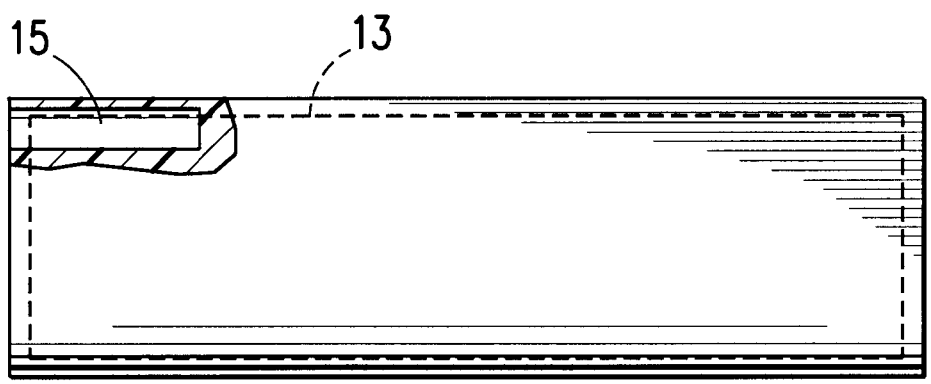
Figure 2A:
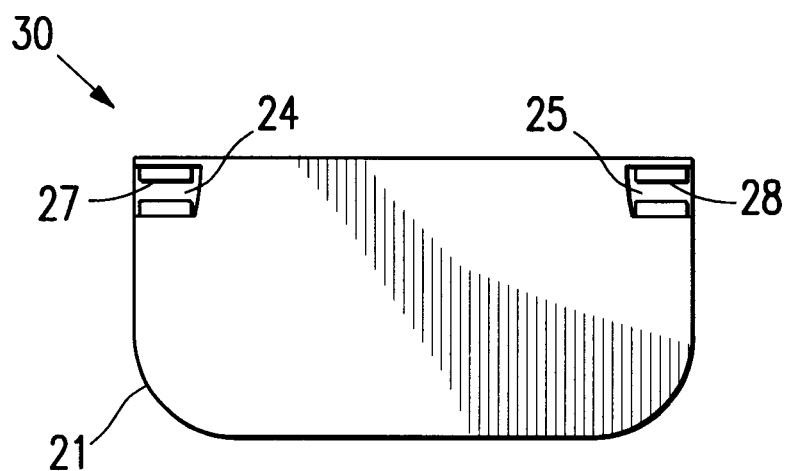
FIGS. 2A and B are end and side views, respectively, of another known and commercially available rechargeable battery pack.
Figure 2B:
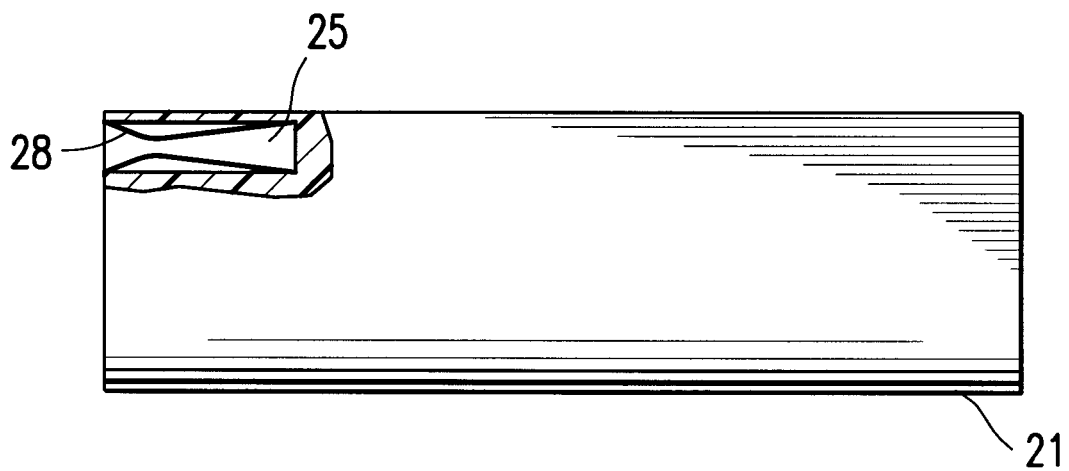
Figure 3:
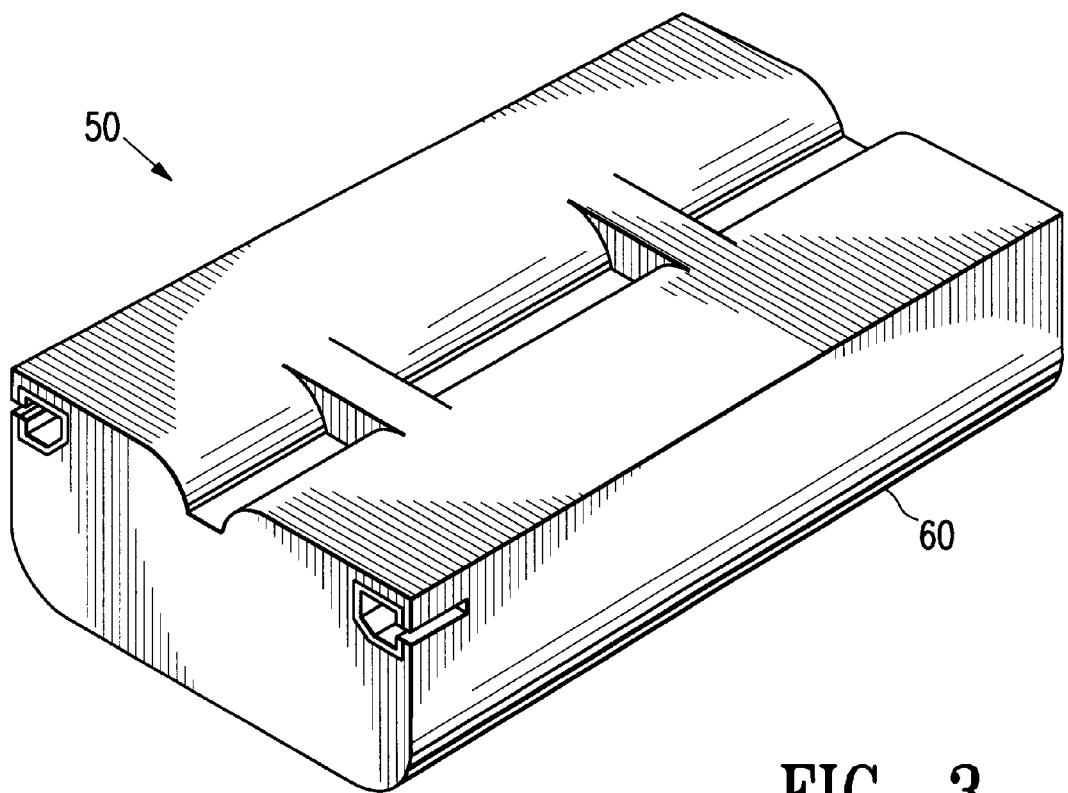
FIG. 3 is a perspective view of an embodiment of a rechargeable battery pack according to the present invention.
Figure 4:
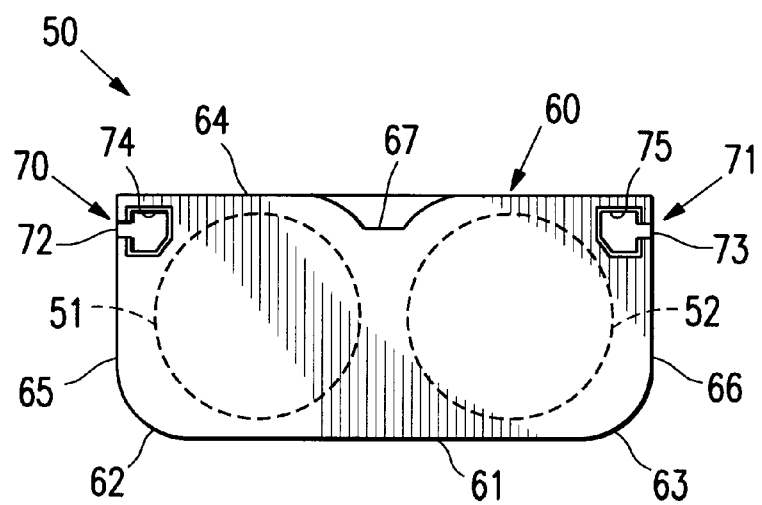
FIG. 4 is a front end view of the rechargeable battery pack shown in FIG. 3.
Figure 5:
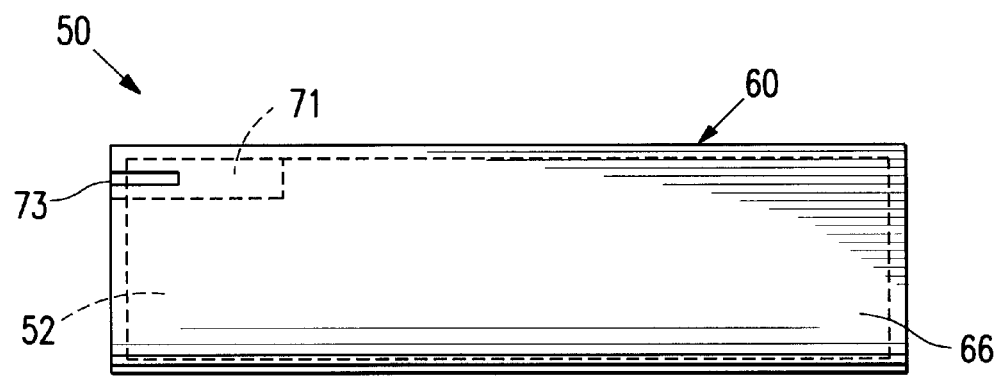
FIG. 5 is a side view of the rechargeable battery pack shown in FIG. 3.
Figure 6:
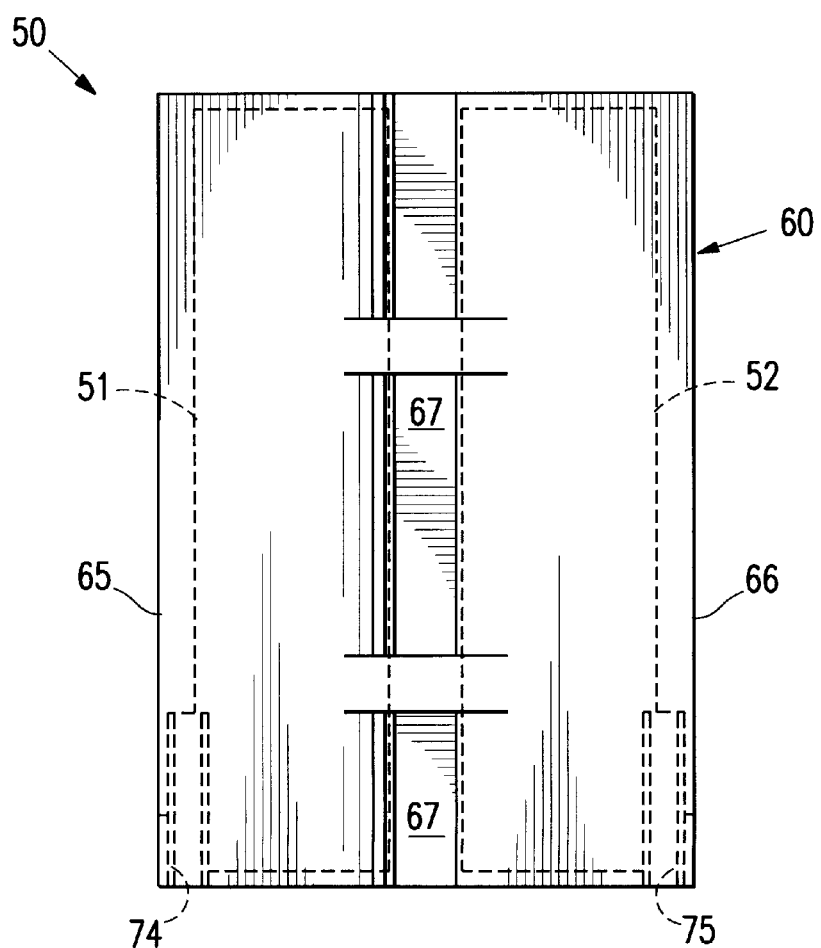
FIG. 6 is a top plan view of the rechargeable battery pack shown in FIG. 3.

The provision of a slit opening in the outer side wall of each terminal of the battery pack allows the terminal to repeatedly make a tight connection to pin terminals without weakening the overall structure of the terminal. In this regard, if the battery pack is accidentally banged or dropped, the force upon contact is absorbed by the structure of the terminal. Specifically, a sudden force transmitted to the area of the battery pack where the terminals are located, i.e. at or about the second wall 64 or side walls 65 and 66 of the housing in the vicinity of the terminals, causes the slit opening of the terminal to momentarily close and the edges of the metal contact element adjacent to and defining the slit opening to engage and abut each other. If the applied force is sufficiently large, the slit could entirely close; for lesser forces the force is managed by the slit and associated portions of the housing. As a consequence, any sudden force is transmitted through and absorbed by the momentarily closed metal contact element 74 or 75. In this manner, the outer walls of the terminal structure are less likely to break than the fragile bottom wall 30 of the U-shaped terminals 24 and 25 of the prior art battery pack shown, for example, in FIG. 2. In a still further and particularly preferred aspect of the present invention, the metal contacts 74, 75 within each of the terminals 70, 71 are resilient and spring-like so that they retain their cross-sectional shape regardless of whether the surrounding plastic case is present or not. Thus, the battery pack can be dropped, completely breaking off a portion of the plastic housing and the anode and cathode pin terminals 74, 75 remain usable as terminals with most of the plastic housing, except a sufficient portion to support and hold the terminals in place, removed from around the pin terminals. This makes the battery pack of the present invention substantially more durable than the conventional designs illustrated in FIGS. 1 and 2.

Housing 60 may be constructed of any known insulating material and is preferably made by injection-molding plastic in a known manner. Most suitably, upper and lower housing sections are individually injection-molded and then permanently adhered to each other after arranging the rechargeable batteries between and within them.

The battery pack of the present invention is used in an otherwise known manner. Thus, the battery pack is inserted into a battery chamber formed in an electronic device such as a video camera device. The battery chamber of the video camera device has substantially the same size and cross-sectional shape as the battery pack. At the inner end of the hollow chamber, the terminals of the battery pack receive and engage complementary metal pins arranged on an inner end wall of the chamber. Due to the presence of the slit openings, the terminals of the battery pack receive and engage the relatively larger diameter metal pins in a snug and secure manner. Electrical energy is thus provided to the video camera from the battery means, through the metal contact elements of the pin terminals, and finally to and through the metal pins formed on the inner end wall of the hollow battery pack receiving chamber of the video camera device.

Various modifications and alternatives will be apparent to those of ordinary skill in the art. For example, while the cross-section of each of the terminals 70, 71 and metal contact elements 74, 75 of the illustrated embodiment is essentially C-shaped, it is clear to the artisan of ordinary skill that the particular shape of the cross-section of the terminals and metal contact elements can vary widely. The requisite provisions are simply that a means for expanding the cross-sectional area of the terminals be provided so that a slightly smaller diameter or cross-sectional area terminal can expand to snugly receive a slightly larger diameter or cross-sectional area pin, or that a thin slit opening be provided on the outer side wall of the terminal and metal contact element of the terminal means so that the metal edges of the metal contact element defining the slit opening can momentarily narrow and even close the slit opening to allow the terminal and metal contact element to absorb a sudden force applied to the battery pack in the vicinity of the terminal. Further, while two batteries 51 and 52 are shown in the embodiment of FIGS. 3 to 6, it is apparent that the battery pack of the present invention may employ one, two, or more than two rechargeable batteries without departing from the spirit and scope of the invention.

The present invention has been described with reference to certain particularly preferred embodiments thereof Those of ordinary skill will appreciate that the invention is not limited to the particularly described embodiments. Modifications and variations of these embodiments will be apparent to those of ordinary skill. As such, the present invention is not limited to the particularly described embodiments and instead the scope of the invention is provided by the claims, which follow.

What is claimed is:

1. A battery pack for an electronic device, comprising:
   an insulated housing;
   at least one battery in the insulated housing; and
   terminal adapted to electrically engage the electronic device;
   wherein the terminal includes open-ended anode and cathode pin terminals formed within opposed corner sections of the housing, each pin terminal including an open-ended metal contact arranged within the pin terminal in electrical contact with the rechargeable battery, and a slit formed through a corresponding outer side wall of both the corresponding corner section of the housing and the metal contact, the slit extending from an open end of the pin terminal along the outer side wall of the housing and the metal contact.

2. A battery pack according to claim 1, wherein the insulated housing is plastic and the pin terminals function as terminals even in the absence of a portion of the plastic housing of the pin terminal.

3. A battery pack according to claim 1, wherein the battery pack comprises at least two rechargeable batteries connected in series and encased in side-by-side relation within the insulated housing.

4. A battery pack according to claim 1, wherein the terminal means has a relatively smaller diameter or cross-sectional area than a relatively larger diameter or cross-sectional area of a terminal pin adapted to be inserted therein, whereby the terminal means is adapted to snugly receive the terminal pin therein.

5. A battery pack according to claim 1, wherein the insulated housing is injection-molded plastic.

6. A battery pack for an electronic device such as a portable video camera, comprising:
   an insulated housing;
   rechargeable battery means permanently encased in the insulated housing;
   terminal adapted to electrically engage the electronic device;
   wherein the terminal includes open-ended anode and cathode pin terminals formed within opposed corner sections of the housing, each pin terminal including an open-ended metal contact arranged within the pin terminal in electrical contact with the rechargeable battery, and wherein each pin terminal has a relatively smaller diameter or cross-sectional area than a relatively larger diameter or cross-sectional area of a terminal pin of the electronic device adapted to be inserted into the pin terminal; and
   slit means through a wall of the metal contact and an adjacent portion of the housing of each pin terminal for expanding the cross-sectional area of the pin terminal upon insertion of a relatively larger cross-sectional area terminal pin into the terminal and for snugly receiving the terminal pin therein.

7. A battery pack according to claim 6, wherein the insulated housing is plastic and the pin terminals function as terminals even in the absence of a portion of the surrounding plastic housing.

8. A battery pack according to claim 6, wherein the battery pack comprises at least two rechargeable batteries connected in series and encased in side-by-side relation within the insulated housing.

9. A battery pack according to claim 6, wherein the insulated housing is injection-molded plastic.

* * * * *